Figure 1:
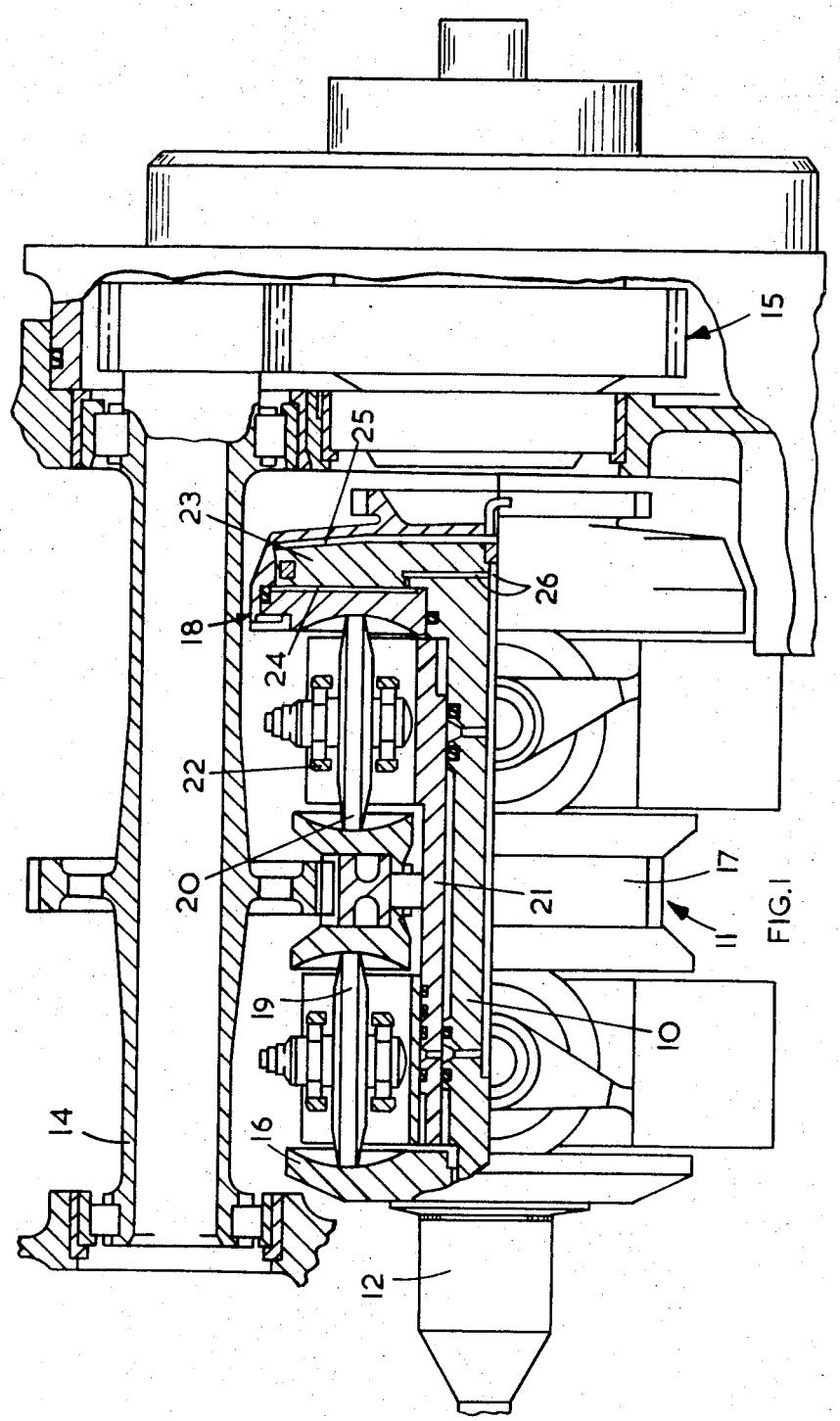

United States Patent [19]

Sharpe et al.

[11] 3,828,618

[45] Aug. 13, 1974

[54] CONSTANT SPEED HYDRAULICALLY CONTROLLED TORIC TRANSMISSION WITH CONCENTRIC, TWO PISTON VALVE, GOVERNOR AND CONSTANT RATIO MEANS

[75] Inventors: Raymond Sharpe, Mirfield; James Christopher Herbert Triffit, Baildon, both of England

[73] Assignee: Rotax Limited, Birmingham, England

[22] Filed: Aug. 2, 1972

[21] Appl. No.: 277,252

[30] Foreign Application Priority Data
July 27, 1971 Great Britain.................... 35381/71

[52] U.S. Cl. ............................................. 74/200
[51] Int. Cl. .......................................... F16h 15/38
[58] Field of Search...................... 74/190, 200, 208

[56] References Cited
UNITED STATES PATENTS
| | | | |
|---|---|---|---|
| 3,142,190 | 7/1964 | Kelsey et al. | 74/200 |
| 3,276,279 | 10/1966 | Perry et al. | 74/200 |
| 3,413,864 | 12/1968 | McGill et al. | 74/200 |

*Primary Examiner*—Samuel Scott
*Assistant Examiner*—Allan Russell Burke
*Attorney, Agent, or Firm*—Holman & Stern

[57] ABSTRACT

A variable-ratio frictional drive gear comprises two axially spaced torus discs between which there is a set of circumferentially spaced drive rollers in frictional rolling contact with toroidal surfaces on the discs. Each roller is rotatably mounted in a roller carriage which can tilt about an axis at right angles to the axis of rotation of the roller so as to vary the distances from the gear axis at which the roller engages respectively the two discs, thus varying the drive ratio of the gear. The variable-ratio frictional drive gear further includes a first piston which is slidable in a second hollow piston under the influence of hydraulic fluid wherein axial movement of the first piston is arranged to effect tilting movement of at least one of the roller carriages. First means are provided to reduce the pressure, which, in use, is applied to the first piston by the hydraulic fluid, such reduction occurring when the first piston reaches a predetermined axial position relative to the second piston. The latter is slidable in a cylinder under the influence of control fluid supplied by a governor and second means are provided which tend to maintain the ratio of the pressures of the hydraulic fluid supplied to the governor and the control fluid supplied by the governor at a constant or substantially constant value.

5 Claims, 3 Drawing Figures

CONSTANT SPEED HYDRAULICALLY CONTROLLED TORIC TRANSMISSION WITH CONCENTRIC, TWO PISTON VALVE, GOVERNOR AND CONSTANT RATIO MEANS

This invention relates to variable-ratio frictional drive gears of the kind comprising two axially spaced torus discs between which there is a set of circumferentially spaced drive rollers in frictional rolling contact with toroidal surfaces on the discs, each roller being rotatably mounted in a roller carriage which can tilt about an axis at right angles to the axis of rotation of the roller so as to vary the distances from the gear axis at which the roller engages respectively the two discs, thus varying the drive ratio of the gear. The angle of tilt of the roller carriages, as it controls the drive ratio of the gear, will hereinafter be referred to as the "ratio angle."

It is an object of the present invention to provide a variable-ratio frictional drive gear in a convenient form.

In accordance with the present invention there is provided a variable-ratio frictional drive gear of the kind hereinbefore described, said variable-ratio frictional drive gear including a first piston which is slidable in a second hollow piston under the influence of hydraulic fluid wherein axial movement of said first piston is arranged to effect tilting movement of at least one of said roller carriages, first means to reduce the pressure, which, in use, is applied to said first piston by said hydraulic fluid, such reduction occuring when the first piston reaches a predetermined axial piston relative to said second piston, the latter being slidable in a cylinder under the influence of control fluid supplied by a governor and second means being provided which tend to maintain the ratio of the pressures of the hydraulic fluid supplied to the governor and the control fluid supplied by the governor at a constant or substantially constant value.

Preferably, an annular groove which defines with said second piston an annular passageway is formed in said first piston and through which passageway in use a source of hydraulic fluid is connected to one axial end of said first piston, said first means comprising a recess formed in said second piston which recess communicates in use with said annular circumferential groove when said first piston reaches said predetermined axial position relative to said second piston to thereby allow hydraulic fluid to escape from said annular passageway.

Desirably, said annular passageway communicates through passage means formed in said first piston with said one axial end of said first piston.

Preferably, the hydraulic fluid which causes said first piston to slide relative to said second piston is connected to the input of the governor.

Figure 2:
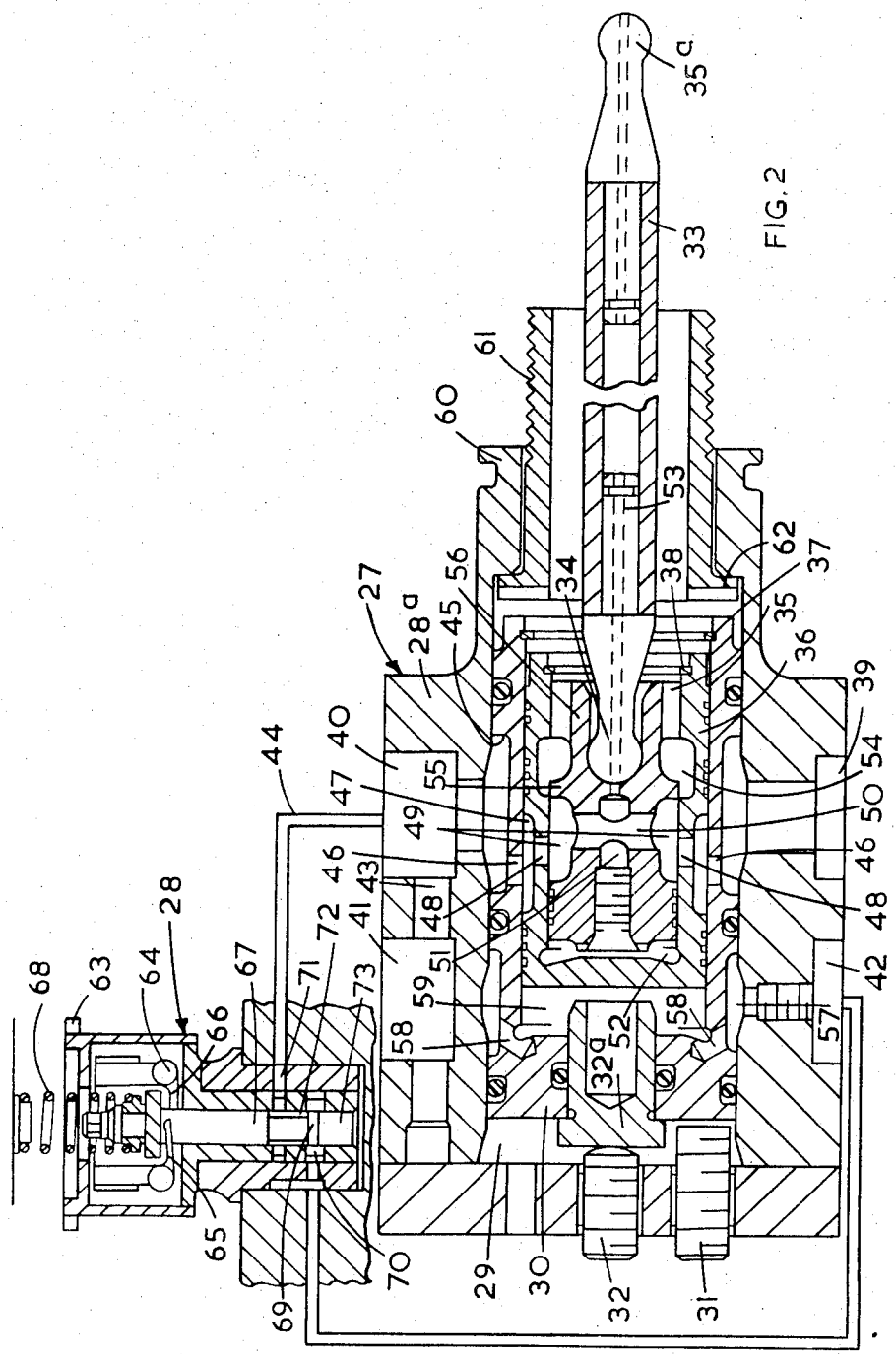
Figure 3:
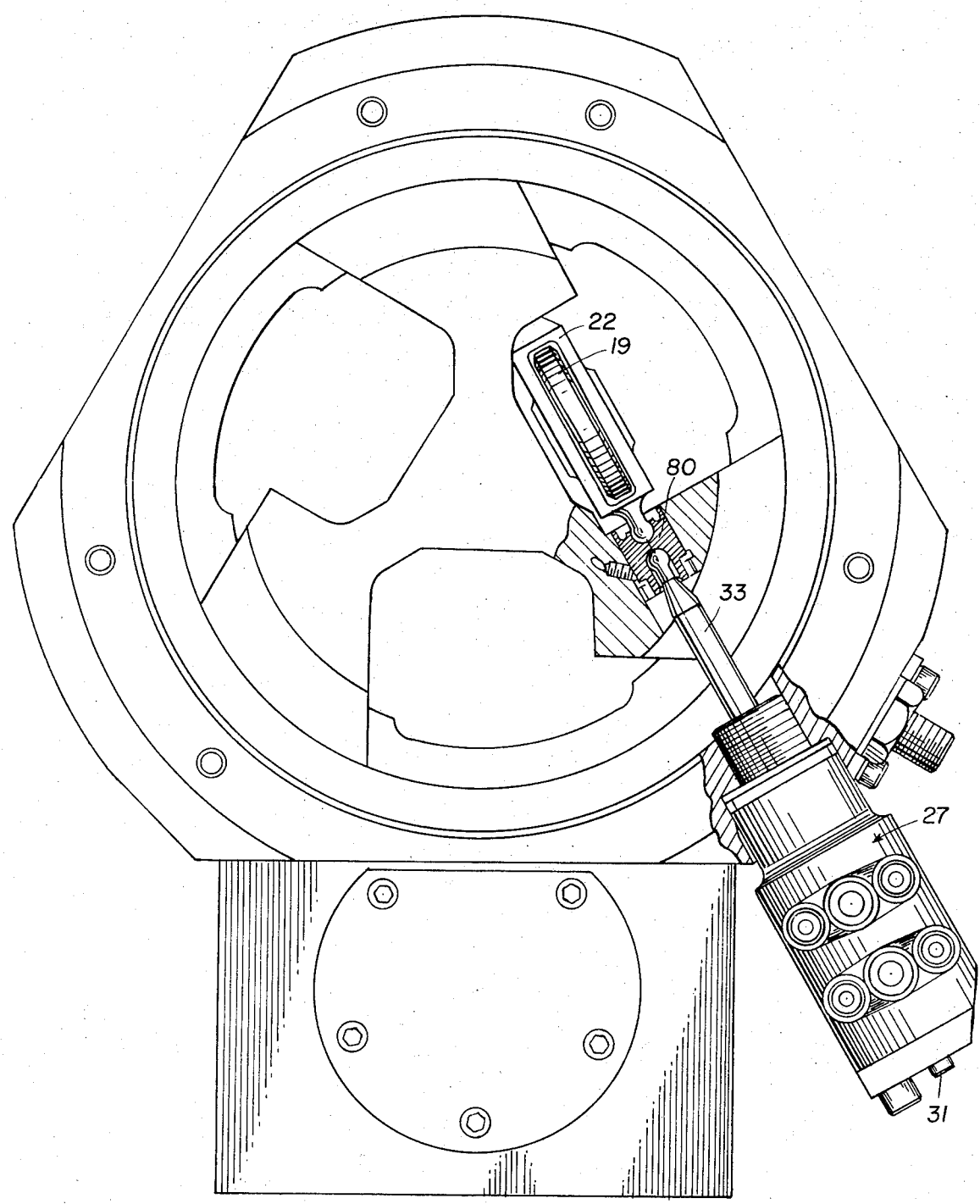

The invention will now be more particularly described with reference to the accompanying drawings wherein:

FIG. 1 is a sectional view of part of one embodiment of a variable-ratio frictional drive gear according to the present invention, FIG. 2 is a sectional view of a further part of the embodiment illustrated in FIG. 1 but on a much larger scale than FIG. 1 and FIG. 3 is a part sectional view showing the drive gear with some of the components omitted for clarity.

Referring to FIG. 1 of the drawings, there is shown therein a variable-ratio frictional drive gear 11 having an output shaft 10 which drives a load shaft 12. The input of the gear 11 is transmitted through a lay shaft 14 from a gear train which is indicated by the reference numeral 15.

The gear 11 consists of three torus discs 16, 17 and 18 between which two sets of rollers 19 and 20 are in frictional rolling engagement, the central disc 17 being double sided. This central torus disc 17 is rotationally connected to the lay shaft 14 (with freedom to move slightly axially) and is mounted on bearings within a sleeve member 21. The outer disc 16 is secured to the output shaft 10 for rotation therewith and so as to be axially fixed with respect to the shaft 10, whilst the other outer disc 18 is connected to the output shaft for rotational movement therewith and axial movement relative thereto. The drive ratio of the gear 11 is varied by altering the ratio angle of the rollers. As shown in FIG. 1, the rollers 19, 20 are shown at a ratio angle at which they engage the central disc 17 at an equal radius to that of the outer discs 16 and 18 respectively, thus the gear as shown transmits a drive at a 1:1 ratio. The rollers 19, 20 are mounted in roller carriages 22 and controls of the ratio angle is achieved by bodily moving the roller carriages 22 in substantially tangential directions with respect to the gear axis, and by allowing the rollers then to steer themselves towards a different ratio angle. The roller carriages are arranged so that a camber angle is furnished, that is to say an angle of inclination exists between the tilt axis of each roller carriage and a plane normal to the gear axis. This camber angle gives rise to a desirable mode of damping which can virtually eliminate any tendency for ratio angle oscillation and this facilitates the design of a highly stable gear without the need for elaborate additional damping devices for achieving the necessary damping. Furthermore, the degree of camber angle provided together with the maximum available tangential movement of each roller carriage will dictate the maximum degree of tilt (or ratio angle change) of the roller carriage.

The disc 18 is hollow and there is provided within the disc 18 a piston 23 which is secured to the output shaft 10. The piston 23 defines two axially spaced chambers 24 and 25 between opposed axial sides of the piston and the hollow disc 18. Pressurised fluid can thus be fed into the chamber 24 via passages 26 to effect axial movement of the disc 18 whilst fluid from a relatively low pressure source can be fed into the chamber 25. Thus, pressure of fluid in the chamber 25 induced by centrifugal force on rotation of the gear 11 will serve to balance or substantially balance fluid pressure in the chamber 24 similarly induced by centrifugal force.

To effect the aforesaid movement of the roller carriages 22 in substantially tangential directions with respect to the gear axis, a control system as shown in FIG. 2 is used. The control system comprises a valve assembly 27 and a governor 28. The valve assembly 27 comprises a housing 28a having a hollow cylindrical cavity 29 in which is disposed a hollow cylinder 30. The cylinder 30 is permitted slight axial movement within the cylindrical cavity 29 for adjustment purposes. However, one axial end of the cylinder 30 normally bears against an adjustable stop 31 arranged in one axial end of the housing 28. A further adjustable stop 32 is provided which stop together with a coacting bush 32a slidable in the adjacent axial end of the cylinder 30 will limit the maximum change of ratio angle of the rollers in one direction. A coupling member 33 is connected to one of the roller carriages 22 in a manner described hereinafter and the coupling member 33 is provided at each of its ends with a part spherical portion 34, 35a wherein the part spherical portion 34 is received in a recess formed in one axial end of a first piston 35 thus universally connecting the coupling member 33 to the piston 35. The piston 35 is disposed within a second hollow piston 36 for slidable movement with respect thereto. This second piston 36 is disposed within the hollow cylinder 30 also for slidable movement relative thereto. The axial ends of the hollow cylinder 30 and the second piston 36 remote from said one axial end of the housing 28 are both open and circlips 37 and 38 are mounted respectively in grooves formed in the inner walls of the cylinder 30 and the piston 36 adjacent to the open ends thereof. These circlips thus limit the axial slidable movement of the second piston 36 in the cylinder 30 and the first piston 35 in the second piston 36 respectively. The housing 28 is provided with four ports 39, 40, 41 and 42 wherein the ports 40 and 41 are interconnected by a passage 43. The port 39 is in use connected to a source of pressurised hydraulic fluid (not shown) in the form of a pump and the port 40 is, in use, connected to a supply pipe 44 which serves as an input to the governor 28. The port 41 is, in use, connected to the passages 26 (shown in FIG. 1) to thereby supply pressurised hydraulic fluid to the chamber 24. The port 42 is, in use connected to a supply pipe which is fed with control fluid from the governor 28. Both the ports 39 and 40 communicate with an annular circumferential groove 45 formed in the cylinder 30 and this groove 45 communicates through apertures 46 with an annular circumferential groove 47 formed in the second piston 36. This groove 47 communicates through apertures 48 formed in the wall of the piston 36 with an annular circumferential groove which is formed in the first piston 35 and which defines with the piston 36 an annular passageway 49. The passageway 49 communicates with a passage 50 formed diametrically through the piston 35 and this passage 50 communicates at its centre with a further passage 51 formed axially in the piston 35. One axial end of the passage 51 communicates via a restricting orifice (not shown) with a chamber 52 defined between that axial end of a piston 35 adjacent to said one axial end of the housing 28a and the internal wall of the hollow piston 36. The aforesaid restricting orifice is provided to limit transients in the fluid supply to the port 39. The other axial end of the passage 51 communicates through a further restricting orifice with the part spherical end portion 34 and through a further passage 53 with the part spherical end portion 35a. Thus, in use, hydraulic fluid supplied to the part spherical end portions 34 and 35a will serve to lubricate the latter.

The piston 36 is formed on that side of the apertures 48 remote from said one end of the housing 28a with an internal annular recess 54 which acts in association with a land 55 of the piston 35 and defined between the annular passageway 49 and a reduced end portion 56 of the piston 35 to form means to reduce the pressure which, in use, is applied to the first piston 35 when the latter reaches a predetermined axial position relative to the second piston 36.

The port 42 communicates with an annular groove 57 formed in the outer surface of the cylinder 30 and disposed on that axial side of the groove 45 proximate to said one end of the housing 28a. The groove 57 communicates through apertures 58 formed in the wall of the cylinder 30 with a chamber 59 defined between the closed end of the second piston 36 and the internal wall of the cylinder 30. The other end of the housing 28a is open so as to permit the coupling member 33 to extend therethrough, but a radially inwardly extending flange 60 is provided at said other end of the housing 28a to locate a bush 61 having a radially outwardly extending flange 62. This bush 61 serves to limit the axial movement of the cylinder 30 which as described above is provided for adjustment purposes.

The governor 28 may conveniently be driven by the load shaft 12 (shown in FIG. 1) to maintain the speed of the latter at a constant value. The governor is of a conventional form and includes pivoted weights 63 which are pivoted on pins 64 and which are rotatable bodily about the axis of the governor so that inwardly directed finger portions 65 on the weights bear upwards on a flange 66 of a piston valve 67, against the action of a spring 68 with a force which increases with increasing rotational speed owing to the centrifugal forces on the weights. When the speed of rotation of the load shaft 12 is at the desired value, a land portion 69 of the piston valve is centrally disposed with respect to a port 70 connected to the supply pipe which is connected to the port 42 formed in the housing 28a. The supply pipe 44 will in use supply hydraulic fluid as aforesaid to an input of the governor, that is to say a port 71 which communicates with an annular chamber 72 defined by the piston valve 67. When, in use, the load shaft is rotating at a speed below the desired value then the land portion 69 will be so disposed that the annular chamber 72 will communicate with the port 70 to thus permit fluid to go through the governor to the port 42 in the housing 28a. The governor is also provided with a drain space 73 such that, in use, if the load shaft 12 attains a speed above the desired value then the land portion 69 will be moved upwardly from the position shown in FIG. 2 and hydraulic fluid within the supply pipe connected to the port 42 will be allowed to fall into the drain space 73 to thus reduce the pressure of hydraulic fluid in the chamber 59.

The part spherical portion 35a of the coupling member 33 is universally connected to a piston 80 which is slidable in a cylinder and the other axial end of the piston is connected to one of the roller carriages 22 so that movement of the coupling member will effect movement of said one roller carriage tangentially with respect to the gear axis and the roller associated with this roller carriage will then steer itself towards a different ratio angle. Each of the other roller carriages 22 will be movable under the influence of hydraulic fluid supplied to one axial end of a similar piston (not shown) slidable in a cylinder (not shown) and to which is universally connected at one end, the associated roller carriage 22. The hydraulic fluid to control the position of these roller carriages is taken from the port 41 in the housing 28a so that, as will become apparent hereinafter, the pressure influencing the movement of the pistons associated with said other roller carriages will be equivalent to the pressure influencing the movement of said one roller carriage.

In operation, the variable-ratio frictional drive gear may conveniently be used to drive an aircraft alternator wherein the input to the gear rotates at a variable speed. Thus to run the alternator up from standstill pressurised hydraulic fluid is fed from the aforesaid pump to the port 39 in the housing 28a from where it flows through the annular groove 45, the apertures 46, the annular groove 47, and the apertures 48 into the annular passageway 49. The fluid will then communicate via the passages 50 and 51 with the chamber 52 and the pressurised fluid in this chamber 52 will urge the piston 35 axially with respect to the piston 36 in a direction away from said one end of the housing 28a (namely the left hand end as seen in FIG. 2). However, it is to be appreciated that as the piston 35 moves axially with respect to the piston 36 then the land 55 will move to permit hydraulic fluid in the annular passageway 49 to communicate with the recess 54 and since this is connected to drain the fluid pressure within the passageway 49 and therefore in the passages 50 and 51 and in the chamber 52 will be reduced. Thus, the fluid pressure within the chamber 52 will cause the piston 35 to steer itself to an axial position with respect to the piston 36 such that the pressure within the chamber 52 is balanced by the reaction force on the rollers associated with the roller carriage connected to the coupling member 33. Hydraulic fluid supplied to the port 39 will also communicate with the ports 40 and 41. The port 41 is connected to the passages 26 and the chamber 24 (FIG. 1) to thus provide an axial loading to the aforesaid torus discs. since the load shaft will be initially at standstill and for some time after it will be rotating at a speed below the desired value, and therefore the land portion 69 of the piston valve 67 will be displaced downwardly from the position shown in FIG. 2 such that the port 71 will communicate with the port 70 of the governor 28 via the annular chamber 72 so that pressurised hydraulic fluid is fed from the port 40 to the port 42. The fluid supplied to the port 42 via the governor 28 will thus enter the annular groove 57 from where it will pass through the apertures 58 into the annular chamber 59 to cause an axial loading on the piston 36. The piston 36 as it moves axially will tend to close any gap previously created between the land 55 and the internal wall of the piston 36 and this will cause the pressure within the chamber 52 to increase. This increase of pressure in the chamber 52 will lead to the piston 35 exerting a greater force on the coupling member 33 to thereby move the roller carriage even further. It will be noted that whilst the alternator is being run up to the required speed the governor will permit a high fluid pressure to be transferred to the chamber 59 and to prevent excessive movement of the roller carriages the circlip 37 limits the axial movement of the piston 36. When this limiting position is reached, any further movement of the piston 35 relative to the piston 36 in a direction away from said one end of the housing 28a will cause the land 55 to move in such a way as to allow more fluid to escape from the annular passageway 49 and thereby effect a reduction in pressure of the fluid in the chamber 52.

As the load shaft 12 and thus the alternator approaches the desired speed the piston valve 67 will move upwardly under the influence of the effect produced by centrifugal force on the governor weights 63 and the land portion 69 will gradually move to a position where it is centrally disposed with respect to the port 70. Thus the pressure of hydraulic fluid applied to the chamber 59 will reduce thereby reducing the axial force applied to the end of the piston 36 adjacent to said one axial end of the chamber 27 and this piston 36 will therefore move in a direction towards said one axial end of the housing 28a under the influence of the reactive force between the rollers and the torus discs. As the piston 36 moves towards said one axial end of the housing 27 more fluid will be allowed to pass from the passageway 49 to drain and this will cause a reduction of fluid pressure in the chamber 52 which will cause the piston 35 also to move towards said one end of the housing 28a. When the load shaft 12 and the alternator reach the required speed the pistons 35 and 36 will attain an equilibrium position wherein the ratio of the fluid pressures within the chambers 52 and 59 will be the same or substantially the same as the ratio of internal axial end area of the piston 35 to the external area of the piston 36. Thus, if the load conditions on the alternator change, thereby requiring different forces to be applied to the axial end of the piston 35 adjacent to said one end of the housing 28a, and when the pistons 35 and 36 have attained their equilibrium positions, the ratio of the fluid pressures within the chambers 52 and 59 will be constant or substantially constant for these different loading conditions of the alternator. This will thus ensure that the piston valve 67 of the governor 28 will maintain the same or substantially the same position during all steady state conditions of the control system.

If, in use, the loading on the alternator does increase, then the reactive force between the rollers and the torus discs will tend to urge the piston 35 in a direction towards said one end of the housing 28a and the land 55 will thus tend to close the passage between the annular passageway 49 and the recess 54. This will lead to an increase of fluid pressure within the annular passageway 49 and therefore in the passages 50, 51 and in the chamber 52 and this will cause the necessary force to be applied to the end of the piston 35 adjacent said one end of the housing 28a to balance this additional reactive force and then thereby maintain the speed of the alternator at the desired speed. A decrease in the load on the alternator will have the opposite effect by virtue of the land 55 moving away from said one end of the housing 28a.

It will be appreciated, that since during all steady state conditions of the control system, force applied to the internal axial end of the piston 36 by the hydraulic fluid in the chamber 52 will be balanced by the force applied to the external axial end of the piston 36 by the hydraulic fluid in the chamber 59, then the force applied to the roller carriage connected to the coupling member 33 will, in effect be caused only by the force of the hydraulic fluid in the chamber 52 on that axial end of the piston 35 adjacent to said one end of the housing 28a. Therefore, by connecting the aforesaid cylinders associated with the other roller carriages to the port 41 which will supply hydraulic fluid at a pressure equal to or substantially equal to the pressure of hydraulic fluid within the chamber 52, then the other roller carriages will be subjected to the same force as the roller carriage connected to the coupling member 33.

Furthermore, by virtue of the fact that the same hydraulic fluid is fed to the chamber 24 as is supplied to control the rollers, the axial loading force by which the torus discs are urged together will always be proportional to the force applied to the rollers. Thus the axial loading is automatically maintained substantially at an appropriate value which is at all times neither too low nor unnecessarily high for permitting the rollers to achieve the required frictional transmission.

It is preferable that a pressure release valve is incorporated somewhere within the hydraulic fluid supply to cater for any fault conditions or surges which may occur within the control system.

It is also to be understood that the control system as described hereinbefore may be modified to cater for the gear operating in the opposite sense, that is to say, instead of the reactive force between the rollers and the torus discs tending to urge the coupling member in a direction away from the associated roller carriage, the reactive force between the rollers and the torus discs may be arranged to pull the coupling member in a direction away from the piston 35.

We claim:

1. A variable ratio frictional drive gear comprising two axially spaced torous discs having respective mutually presented toroidal surfaces, a set of circumferentially spaced drive rollers in frictional rolling contact with the toroidal surfaces on the discs, roller carriages in which the rollers are respectively rotatably mounted about respective axes, the roller carriages being tiltable about axes at right angles to the roller axes, to vary the distances from an axis of the drive gear at which the rollers engage the discs, a first piston arranged to control tilting movement of at least one of said roller carriages, a second hollow piston in which the first piston is slidable, a first pressure reducing means operable when said first piston reaches a predetermined position in relation to said second piston, a cylinder in which the second piston is slidable, a governor for supplying control fluid to said cylinder, means for supplying fluid under pressure to said governor, and second means to obtain a constant ratio of respective pressures of fluid supplied to the governor and cylinder.

2. A variable ratio frictional drive gear as claimed in claim 1 wherein said first piston has formed in it an annular circumferential groove which defines, with said second piston, an annular passageway a source of hydraulic fluid communicating through said passageway with one axial end of said first piston, said first pressure reducing means comprising a recess formed in said second piston which communicates with said annular circumferential groove when said first piston reaches said predetermined axial position relative to said second piston.

3. A variable ratio frictional drive gear as claimed in claim 2 wherein passage means are provided in the first piston, through which said annular passageway communicates with said one axial end of said first piston.

4. A variable ratio frictional drive gear as claimed in claim 1 wherein said second means comprises a pair of opposed surfaces on said second piston, the ratio of the areas of the two surfaces being inverse to the ratio of the pressures when said second piston is in an equilibrium position.

5. A variable ratio frictional drive gear as claimed in claim 1 wherein mechanical connecting means connect said first piston to one of said roller carriages.

* * * * *